United States Patent [19]

Chilcote

[11] Patent Number: 4,921,081
[45] Date of Patent: May 1, 1990

[54] HYDRAULIC BRAKE APPARATUS FOR BICYCLES

[75] Inventor: Keith C. Chilcote, Pacifica, Calif.

[73] Assignee: Autra-Bike Co., Inc., San Francisco, Calif.

[21] Appl. No.: 289,627

[22] Filed: Dec. 22, 1988

[51] Int. Cl.$^5$ .......................... B62L 3/02; B62K 23/06
[52] U.S. Cl. .................................... 188/344; 74/551.8
[58] Field of Search ................ 188/24.22, 71.8, 196 P; 74/523, 551.8, 569

[56] References Cited

U.S. PATENT DOCUMENTS

| | | |
|---|---|---|
| 2,050,682 | 8/1936 | White . |
| 2,346,758 | 4/1944 | Hughes .............................. 188/344 |
| 2,385,625 | 9/1945 | Hopmans . |
| 2,503,488 | 4/1950 | Huffman . |
| 2,571,963 | 10/1951 | Stelzer . |
| 2,746,575 | 5/1956 | Kinchin . |
| 2,830,680 | 4/1958 | Hawley ....................... 188/196 P X |
| 2,844,228 | 7/1958 | Schnell . |
| 2,961,831 | 11/1960 | Brueder . |
| 2,966,964 | 1/1961 | Brueder . |
| 2,997,137 | 8/1961 | Hodkinson . |
| 3,085,663 | 4/1963 | Jakeways ......................... 188/196 P |
| 3,170,543 | 2/1965 | Cook et al. . |
| 3,554,334 | 1/1971 | Shimano . |
| 3,589,481 | 6/1971 | Motsch et al. ....................... 188/345 |
| 3,776,333 | 12/1973 | Mathauser ............................ 188/344 |
| 3,880,260 | 4/1975 | Schoenhenz ........................ 188/72.9 |
| 4,175,648 | 11/1979 | Sule ..................................... 188/344 |
| 4,176,886 | 12/1979 | Watanabe ........................ 188/344 X |
| 4,291,590 | 9/1981 | Mizusaki ........................... 74/551.8 |
| 4,501,340 | 2/1983 | Yoshida ........................... 188/344 X |
| 4,635,442 | 1/1987 | Bass ................................ 188/344 X |
| 4,637,273 | 1/1987 | Nagano ......................... 74/551.8 X |

FOREIGN PATENT DOCUMENTS

| | | |
|---|---|---|
| 101167 | 2/1899 | Fed. Rep. of Germany . |
| 817543 | 10/1951 | Fed. Rep. of Germany . |
| 2607080 | 10/1976 | Fed. Rep. of Germany . |
| 622294 | 5/1927 | France . |
| 783659 | 7/1935 | France . |
| 904044 | 10/1945 | France . |
| 581556 | 11/1976 | Switzerland . |
| 3651 | 2/1904 | United Kingdom . |
| 800196 | 8/1958 | United Kingdom . |

OTHER PUBLICATIONS

Advertisement for "DURA-ACE AX BRAKESET," distributed by Shimano Sales Corporation.
Excerpt from "BICYCLING SCIENCE," by Frank Rowland White and David Gordon Wilson, (pp. 208-213).
Excerpt from "AMERICAN BICYCLIST & MOTORCYCLIST," (p. 34).
Advertisement for "V.A.P.O.R. STEM".

*Primary Examiner*—Duane A. Reger
*Attorney, Agent, or Firm*—Knobbe, Martens, Olson & Bear

[57] ABSTRACT

An improved hydraulic brake apparatus for bicycles wherein brake pads are operably associated with both the front and rear wheels of the bicycle and manually actuated by a brake handle to enforce braking conditions. The improved brake apparatus includes an immersed valve member in a vertical hydraulic mechanism designed for simple and efficient performance, an improved linkage that provides increased mechanical advantage, self-adjusting retraction screws that allow for customary pad wear, an improved housing clamp for mounting the housing to the handlebar and an enhanced hose fitting that is likewise designed for simple, effective performance.

26 Claims, 4 Drawing Sheets

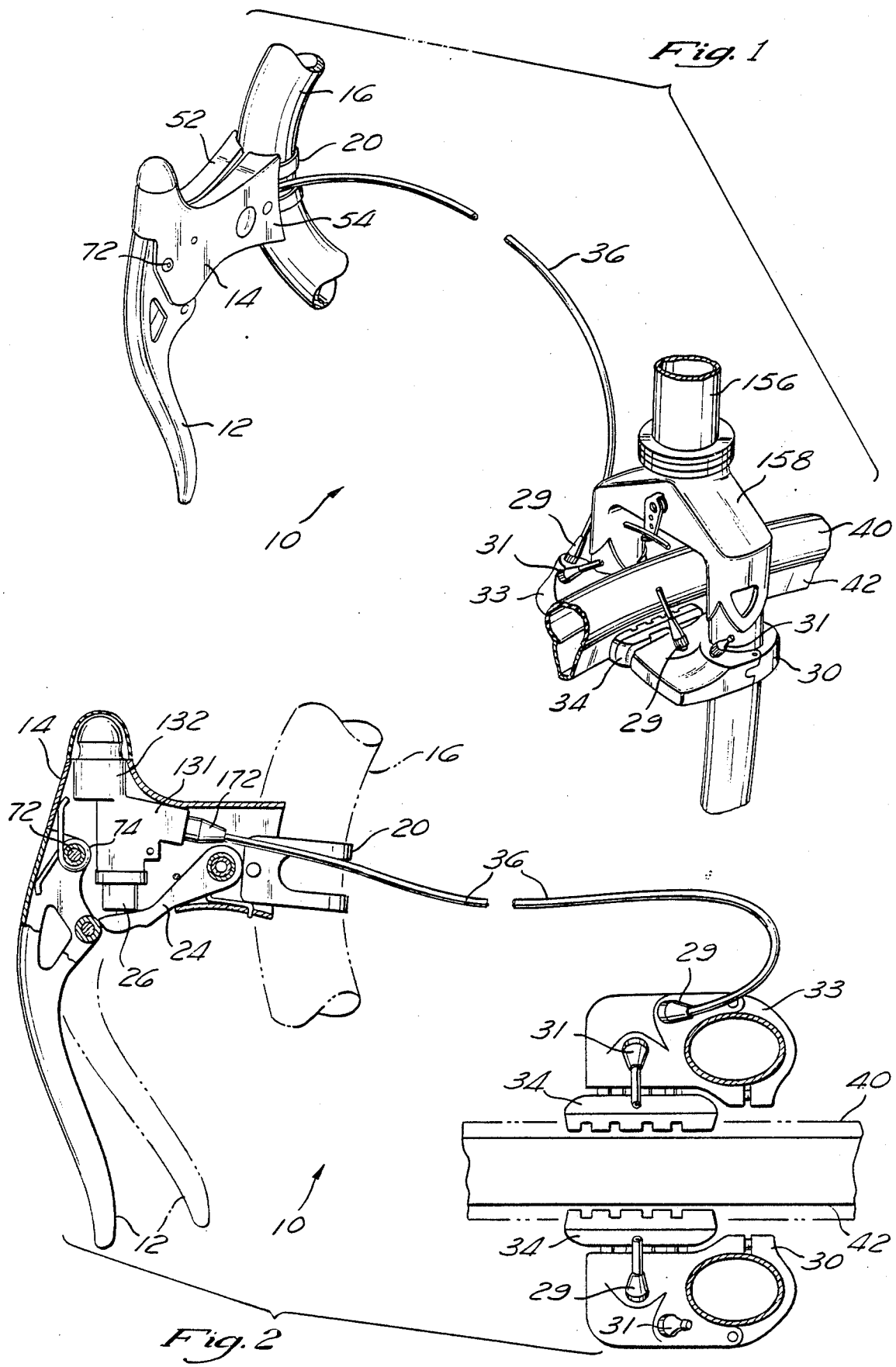

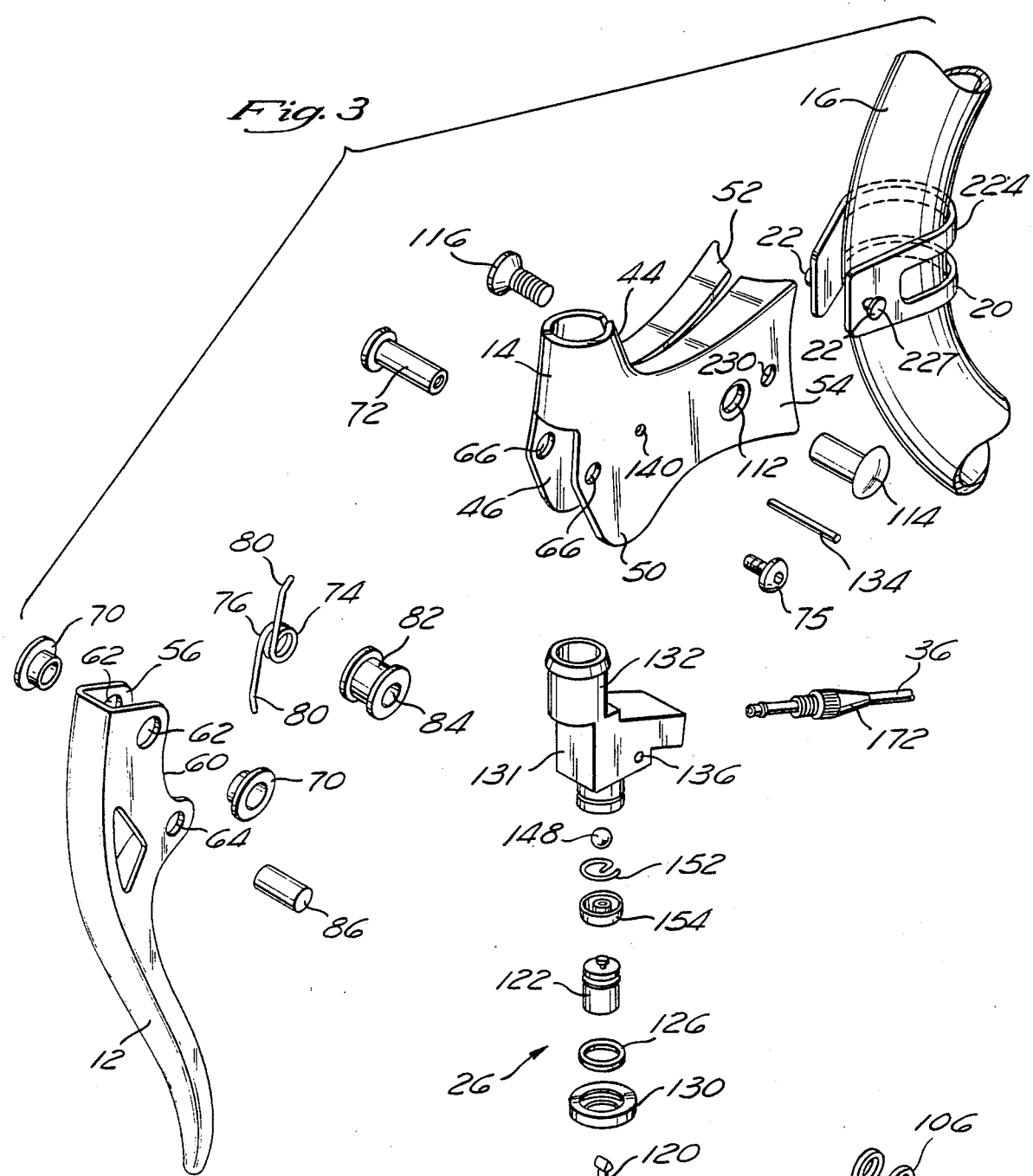
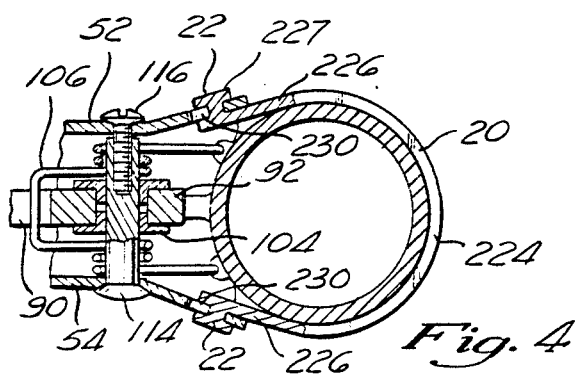
Fig. 3
Fig. 4

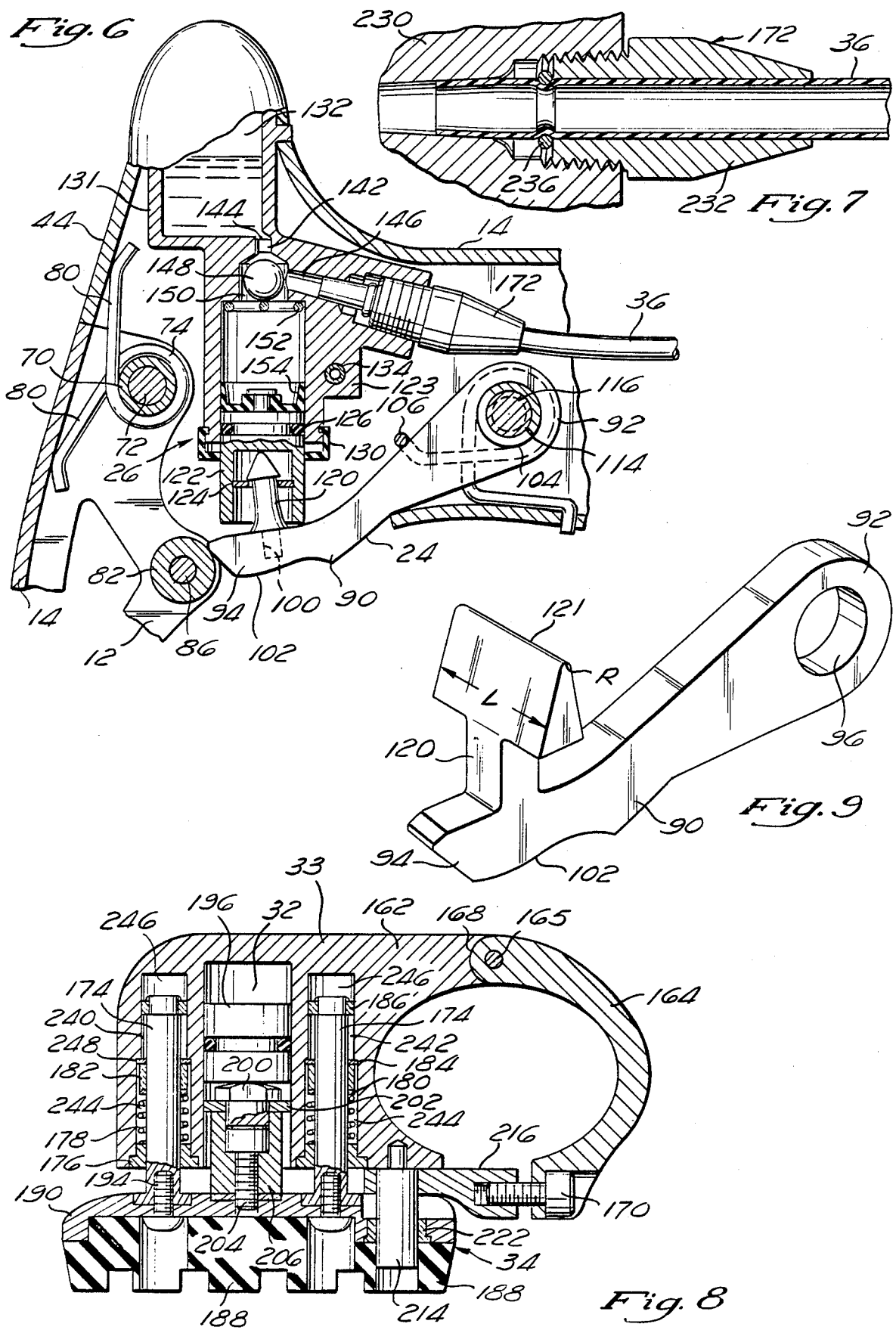

HYDRAULIC BRAKE APPARATUS FOR BICYCLES

BACKGROUND OF THE INVENTION

1. Field of the Invention

The present invention relates generally to a hydraulic braking apparatus for bicycles which is manually actuated to enforce braking conditions, and more particularly to an improved hydraulic braking system characterized by an overall enhanced performance that makes it possible to obtain a highly efficient brake system most suitable to the bicycle.

2. Description of the Prior Art

Many kinds of hydraulic braking systems actuated by a hand operated mechanism are known to be used for braking purposes with conventional bicycles. Hydraulic braking systems typically utilize a master cylinder assembly in fluid communication with slave cylinders, wherein the master cylinder assembly is manually actuated by a brake handle. The manual pressure on the handle is transmitted by the master cylinder assembly via the hydraulic fluid to actuate the slave cylinders, which in turn force brake pads positioned on either side of the bicycle wheel to frictionally engage the rim of the bicycle wheel.

The operation of conventional hydraulic systems incorporating a hand actuated mechanism, as described above, is somewhat restricted by limiting factors that impede the efficient performance of the brake system. One such limiting factor exists in the amount of displacement of the actuating handle of the mechanism, which is limited to the gripping range of the bicycle rider's hand. Another limiting factor exists in the need for a reasonable running clearance that must be maintained between the friction pads and the rim of the bicycle. Due to this necessary running clearance there is a minimum distance the friction pads must travel from the rest state to the actuated or braking state. These factors contribute toward limiting the magnitude of a constant mechanical advantage possible with the above described system. Conventional systems have also been unsatisfactory since in wet weather conditions the pad-to-rim friction coefficient drops to about half, consequently resulting in the application of increased effort to enforce braking conditions Additionally, a consistent relationship between the hand lever displacement and the braking action which is provided by brake pads is essential for predictable operation. For example, since brake pads have a tendency to wear, and thus become thinner, additional displacement of the piston in the slave cylinder is required for the pads to effectively engage the wheel rim. Thus, the degree of manual displacement of the hand lever required to cause brake pad-to-rim contact varies as the brake pads wear. It is desireable to have a self-adjusting system which would avoid the frequent maintenance required to adjust brake pads for wear.

Although hydraulic brake systems are commonplace on automobiles, such systems are known to be characterized by disadvantages, some of which are enumerated below. Conventional hydraulic brake systems for automobiles typically have a brake fluid reservoir and a master cylinder with a master piston, in fluid communication with slave cylinders. Such systems are known to incorporate the use of a check valve member constructed and arranged to control fluid flow from the master cylinder to the slave cylinders. Some such conventional hydraulic brake systems employ a ball check valve member that is spring biased against the valve seat to limit the flow of fluid. An automobile master cylinder typically employs a very small hole, in the master cylinder for providing fluid communication with the fluid reservoir. Typically, the master cylinder is horizontally oriented proximate to and below the fluid reservoir, so that brake fluid flows by gravity, from the reservoir, via the hole, to the master cylinder. The hole is small, for example 0.04 inch in diameter to prevent the rubber cup or seal on the piston of the master cylinder from extruding through the hole during operation. Thus the rate of fluid flow through the small hole is slow and insufficient to rapidly replenish fluid to account for adjustment and bleeding. To overcome this disadvantage, some automotive master cylinders employ auxiliary openings between the fluid reservoir and the master cylinder, to provide additional fluid flow paths to replenish fluid in the brake system. However, the auxiliary openings also cause increased manufacturing costs and maintenance requirements.

In such master cylinders, another limiting factor resulting from the horizontal orientation of the master cylinder for the rate of fluid replenishment is the tolerances that must be held for the cup to prevent extrusion under pressure. The cup must collapse during the return stroke and fluid must pass by the close tolerance parts. Additionally, when the friction pads need to be replaced, and the caliper or slave pistons are manually retracted, the fluid must pass through the small diameter hole and back into the reservoir which is facilitated by a C-Clamp.

Another limiting factor in the typical master cylinder design is the relationship between the bore length and the stroke of the piston, wherein the minimum bore length is increased to accommodate larger springs because the required spring rate is considerable to collapse the cup and pull fluid from the reservoir during fluid replenishment.

For example, U.S. Pat. Nos. 2,385,625 to Hopmans; 2,503,488 to Huffman; 2,571,963 to Stelzer; 2,746,575 to Kinchin; and 2,961,831 to Brueder show various schemes that incorporate an auxiliary valve for automatic adjustment of the fluid content in hydraulic transmission systems to compensate for wear and movement in the brake system.

Thus, it is desirable to provide a hydraulic system incorporating a valve member that eliminates the use of auxiliary openings, yet still provides sufficient flow between the master cylinder and the reservoir. Likewise, it is desirable also to orient the valve member such that when the brake pads are manually pushed away from the rim of the wheel, for example, when changing the brake pads or wheel, the fluid returning to the master cylinder from the slave cylinders encounters minimal interference from the valve member. To facilitate maintenance, it is also desireable for the master cylinder assembly to be easily removable from the bicycle by disassembling the brake lines so that the brake system can be repaired without bringing the entire bicycle to the repair shop.

Thus, a need exists for an efficient hydraulic braking system for bicycles with a combination of improvements interacting to substantially enhance performance and reduce maintenance of the braking system.

SUMMARY OF THE INVENTION

Briefly stated, the present invention is an improved hydraulic brake apparatus for a bicycle in which brake pads are arranged in pairs to frictionally engage either side of a bicycle rim. The brake pads are hydraulically actuated to enforce braking conditions. The improved hydraulic brake apparatus includes a master cylinder assembly for each pair of pads, which is manually actuated by a brake handle. Preferably the brake handle is mounted to a handlebar.

A fluid reservoir is oriented above a fluid outlet chamber which is vertically aligned with the master cylinder assembly to allow the gravitational flow of fluid from the fluid reservoir to the fluid outlet chamber and the master cylinder assembly The fluid outlet chamber is in fluid communication with the fluid reservoir via an inlet. The fluid outlet chamber is also in fluid communication with brake lines via an outlet. The fluid outlet chamber includes a valve member, preferably spherical in shape, which controls flow into and out of the fluid reservoir and the master cylinder.

In one preferred embodiment of the invention, when the brake handle is in a rest position, the valve member rests in a lower portion of the fluid outlet chamber as a result of gravitational force. When in this position, the valve member obstructs neither the inlet from the fluid reservoir to the fluid outlet chamber nor the outlet from the fluid outlet chamber to the brake line. Flow is also unobstructed between the fluid outlet chamber and the master cylinder. Thus, the reservoir is able to keep the brake lines full of hydraulic fluid. When the brake handle is manually actuated, movement of the fluid from the master cylinder forces the valve member against the inlet from the fluid reservoir to the fluid outlet chamber, thereby effectively blocking the flow of fluid back into the fluid reservoir. Additionally, flow is also unobstructed between the fluid outlet chamber and the master cylinder. Thus, the only path provided for movement of the fluid from the fluid outlet chamber in response to the applied pressure is through the brake lines, which provide fluid communication to slave cylinders.

When hydraulic pressure is applied through the brake lines, the slave cylinders in turn cause displacement of the brake pads so as to engage the bicycle rim. When the brake handle is released, the valve member falls again to the rest position in the fluid outlet chamber of the master cylinder, thus opening the path between the fluid reservoir and the brake lines. Any loss of fluid due to adjustment, or the like, is replenished directly from the brake fluid reservoir to the brake lines.

An important feature of the invention resides in the requirement of only a single opening between the fluid reservoir and the master cylinder assembly Additionally, since the fluid reservoir is vertically oriented with respect to the master cylinder assembly they are easily mounted on the vertical portion of the handlebars, where the brake handle is preferably located.

Another feature of the invention results from the orientation of the inlet and outlet to the fluid outlet chamber relative to the spherical valve member such that flow through the outlet does not cause the valve member to be displaced so as to block the inlet. Thus, when the brake pads are manually pushed away from the rim, to facilitate a change of brake pads, or the like, advantageously the fluid returns to the fluid reservoir from the slave cylinders directly via the brake lines and the fluid outlet chamber without interference from the spherical valve member.

A further feature of the invention consists in providing self-adjusting retraction screws on the brake pads. This particular feature automatically adjusts for customary pad wear and eliminates the need for frequent maintenance. Preferably, each of the slave cylinders are connected to the brake pads with a pair of spring-biased retraction screws which cause the brake pads to be retracted when hydraulic pressure in the slave cylinders is released. The retraction screws are frictionally engaged by a surrounding grip ring that applies pressure against a compression spring. The spring force of the compression spring is insufficient to cause slippage of the grip rings along the retraction screws. As the brake pads wear, and consequently become thinner, additional movement of the piston in the slave cylinder is required for the pads to engage the wheel rim. In this case, the compression spring will become completely compressed during braking and the force of the hydraulic fluid pushing against the piston in the slave cylinder will cause the retraction screws to slip within the grip rings. When the hydraulic pressure is again released, the compression spring will push against the grip ring and thus against the retraction screws to cause the brake pads to be pulled away from the wheel rim, however to a new rest position, such that the added clearance between the brake pads and the rim is compensated for with the wear of the pads. The combination of the retraction screws and the grip ring operate in a similarly opposite manner when the brake pads are manually pushed against the cylinder to provide increased clearance between the brake pads and the rim to facilitate removal of the bicycle wheel.

Still another feature of the invention resides in a mechanical linkage which joins the brake handle to the master cylinder assembly. When the brake handle is manually operated, the linkage actuates the master cylinder assembly. The linkage includes a cam roller on the brake handle which engages a cam lever, wherein the surface of the cam lever incorporates a variable slope which provides the brake handles with a progressive mechanical advantage over the master cylinder piston. Beginning from the initial rest position of the brake handles, the brake handles have a small mechanical advantage so that initial movement of the brake handle causes a relatively large movement of the master cylinder. The resulting effect of such an arrangement is that the brake pads are rapidly engaged against the rim of the wheel upon actuation of the brake handle. This facilitates a relatively large clearance distance between the brake pads and the wheel rim without causing an undue sacrifice in the amount of handle displacement required to actuate the brakes.

As the brake handle is moved further away from the rest position, the configuration of the linkage between the brake handle and the master cylinder incorporating the cam lever with the variable slope increases the mechanical advantage considerably. Consequently, although the relative movement of the brake pads becomes less with respect to the movement of the brake handle, the mechanical advantage is increased significantly, and the brake pads are applied more forcefully against the wheel rim. The mechanical linkage utilizing the variable slope cam has an initial slope that is steep to provide rapid movement of the master cylinder and has a shallower following slope to provide the increased mechanical advantage.

In addition, the mechanical linkage further includes an improved push rod which is the means of transmitting force between the cam lever and the piston. The cam lever rotates upon actuation, and is secured to the push rod so as to cause the push rod to move in a radial arc. The improved push rod is structurally adapted such that the top of the push rod, which directly engages the master piston, gradually tapers to an elongate cylindrical curvature which minimizes the detrimental effects caused by the angular movement of the push rod Because of the small radius at the top, the push rod maintains a nearly consistent area of contact with the piston during actuation. The elongate curvature of the tapered tip of the push rod increases the surface area and thus, reduces stress at the tip. Advantageously, such an adaptation of the push rod reduces wear and enhances the effective force transfer between the push rod and the master piston.

Another feature of the present invention is a novel structure for mounting the brake handle housing to the handlebar. The brake handle housing structure comprises extending projections that gradually deviate from each other in opposing directions. A C-shaped housing clamp having two spaced extensions surrounds the handlebar. The extensions of the housing clamp are surrounded by the deviating projections of the housing structure in such a way that the deviating projections of the housing structure abut against the C-shaped portion of the housing clamp. Two small diameter clamp catch pins, each having a flat head of larger diameter mounted to each of the extensions of the housing clamp extend through apertures formed in the projections of the housing structure. The deviating projecting portions of the housing are brought closer together by increasing the tension in a clamp screw which extends through one housing projection and which threads into a pin that extends through the other housing projection. With the increase in tension, the deviating projecting portions gradually are drawn closer together and bring the extensions of the housing clamp closer together, thus securing the clamp to the handlebar. As the deviating projecting portions of the housing are brought together, they slide relative to each of the clamp catch pins. As a result, the heads of the pins are offset relative to the apertures, preventing passage of the heads therethrough. Advantageously, the housing is detached from the handlebar by simply releasing the tension in the clamp screw so that the deviating projecting portions of the housing structure deflect away from each other such that the offset apertures can be centered around the flat heads of the clamp catch pin, so that the heads can pass through the apertures.

A further feature of the present invention exists in an improved design of a hose fitting which is preferably used to join the brake line to the master and slave cylinders. The hose fitting comprises a female member that is internally threaded to mate with an externally threaded, tubular male member. The line extends through the male member and into the female member. Abutting the threaded portion of the female member, is a tapered portion that surrounds the external portion of the line. The line protrudes through the male member and the protrusion is secured by a crimp ring that surrounds the exterior of the line. When the male and female members are threaded together, the line is forced, via the crimp ring, into the tapered portion of the female member, thus causing a seal. The improved design is light, compact, easily manufactured and easily utilized by the operator.

BRIEF DESCRIPTION OF THE DRAWINGS

Some preferred embodiments of the invention are illustrated in and by the following drawings in which like reference numerals indicate like parts and in which:

FIG. 1 is a fragmentary, perspective view illustrating the brake handle assembly and the caliper assembly of a preferred embodiment of the present hydraulic braking system.

FIG. 2 is a partially cross sectional, side view and top view illustrating the details of the present hydraulic braking system shown in FIG. 1.

FIG. 3 is a perspective, exploded view illustrating the brake handle and master cylinder assembly of the present braking system.

FIG. 4 is a cross sectional plan view illustrating the housing clamp of the present braking system.

FIG. 6 is a partially cross sectional side view of the master cylinder assembly of the present braking system.

FIG. 7 is a cross sectional side view illustrating a hose fitting according to the present braking system.

FIG. 8 is a cross sectional plan view illustrating the front caliper of the present braking system.

FIG. 9 is a perspective view illustrating the push rod and cam lever of the present braking system.

DETAILED DESCRIPTION OF A PREFERRED EMBODIMENT

Figure 5:
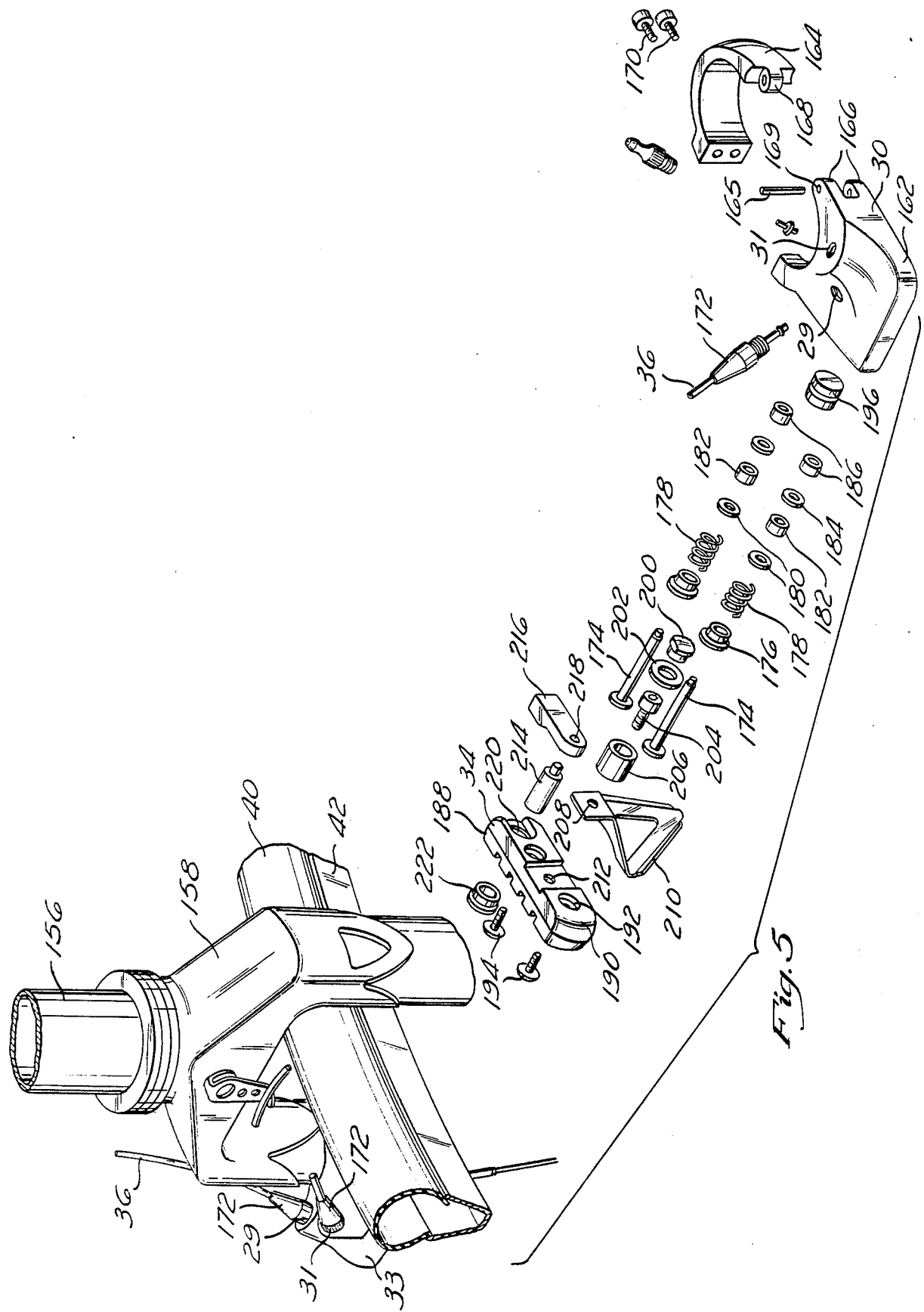
FIG. 5 is a perspective, exploded view illustrating the front caliper assembly of the present braking system.

Referring now to the drawings, FIGS. 1 and 2 illustrate generally a hydraulically actuated brake assembly 10 to be used in a conventional bicycle (not shown). Typically, the hydraulically actuated brake assembly 10 includes a brake handle 12, which is pivotally mounted to a housing 14 by a handle pivot pin 72. The housing 14 is firmly mounted to a conventional, curved, cylindrical handlebar 16 by a C-shaped housing clamp 20. The housing clamp 20 is secured to the handlebar 16. The brake handle 12 is joined by a linkage 24 to a master cylinder assembly 26, which is in fluid communication with a brake fluid reservoir 132. The master cylinder assembly 26 and the brake fluid reservoir 132 are in vertical orientation within a block 131 which is enclosed within the housing 14.

As is discussed in greater detail below, the master cylinder assembly 26 is filled with hydraulic fluid. When a manual force is applied to cause pivoting of the brake handle 12 about the pivot pin 72, the linkage 24 actuates the master cylinder assembly 26, wherein hydraulic pressure is induced in the brake system. A right front caliper 33 and a left front caliper 30 are mounted on a front fork 158 of the bicycle. Each of the front calipers 33,30 encases a slave cylinder 32, as shown in FIG. 8. The right front caliper 33 and the left front caliper 30 are substantially identical. Each of the front calipers 33,30 also include a caliper inlet 29 and a caliper outlet 31. A small diameter, tubular brake line 36 filled with hydraulic fluid provides fluid communication between the master cylinder assembly 26 and the caliper inlet 29 of the right front calipers 33. The caliper outlet 31 of the right front caliper 33 is joined to the caliper inlet 29 of the left front caliper 30. The caliper outlet 31 of the left front caliper 30 is sealed to prevent the fluid from escaping from the slave cylinder 32 of the left front caliper 30. The brake line 36 conducts the hydraulic pressure from the master cylinder assembly 26 to actuate the slave cylinders 32. The slave cylinders 32 are in contact with flat, elongate brake pads 34. The slave cylinders 32 when actuated displace the brake pads 34. The brake pads 34 are arranged on either side of a conventional, circular, bicycle wheel 40 having a wheel rim 42. The slave cylinders 32 when actuated urge the brake pads 34 into frictional contact with the wheel rim 42 of the bicycle wheel 40, thereby enforcing braking conditions.

It should be understood that a front brake assembly is operably associated with the front wheel and a substantially identical rear wheel assembly is likewise operably associated with the rear wheel for applying a braking force to the front and rear wheels respectively. However, to avoid repetition only the front brake assembly is discussed.

FIGS. 3 and 6 illustrate the master cylinder assembly 26, the housing 14, the linkage 24 and the brake handle 12 in substantial detail. The housing 14 comprises a hollow structure 44 having two vertically oriented walls 46 and 50 extending along a longitudinal axis and terminating in two deviating projections 52 and 54, respectively, adjacent the handlebar 16. The deviating projections 52,54 gradually deflect away from each other as they approach the handlebar 16. The brake handle 12 is curvilinear in shape, having two generally parallel, radially projecting portions 56 and 60. The walls 46,50 of the housing 14 surround each of the projecting portions 56,60 of the brake handle 12. Each of the projecting portions 56,60 of the brake handle 12 includes two identical aligned openings 62 formed towards the upper end of the projections 56,60 and two relatively smaller identical aligned apertures 64 formed towards the lower end of the projections 56,60. The openings 62 correspond with two similar aligned openings 66 formed in the housing 14. Two identical handle bushings 70 are placed between the exterior of the radially projecting portions 56 and 60 of the brake handle 12 and the interior of the housing 14. A handle pivot pin 72 is received through the handle bushings 70, the aligned openings 66, and a handle spring 74 and is secured in place by a handle pivot screw 75. Thus, the brake handle 12 is pivotally secured to the housing 14 about the pin 72. The handle spring 74 comprises a coiled portion 76 through which the pivot pin 72 passes and a pair of legs 80 extending radially outward. The legs 80 of the handle spring 74 engage the brake handle 12 and the interior of the housing, respectively, so as to bias the brake handle 12 to return to its rest position (shown in solid lines in FIG. 2) when the manual pressure on the brake handle 12 is released A cylindrical cam roller 82 is positioned between the two smaller aligned apertures 64 in the brake handle 12 so that a central opening 84 in the cam roller 82 is aligned with the apertures 64. The cam roller 82 is held in place by a slim, cylindrical cam roller pin 86 which extends through the central opening 84 in the cam roller 82 and the two apertures 64 in the brake handle 12. When the brake handle 12 is pulled toward the handlebar 16, as shown (in broken lines) in FIG. 2, the brake handle 12 pivots about the handle pivot pin 72 and the cam roller 82 describes a radial arc.

The linkage 24 connects the brake handle 12 with the master cylinder assembly 26, which is enclosed within the housing 14. The linkage includes a cam lever 90 which is preferably wide at one end 92 and gradually tapered at another end 94. The wide end 92 of the cam lever 90 is provided with a horizontally aligned, circular opening 96. The top of the tapered end of the cam lever 90 is also provided with a vertically oriented, relatively smaller opening 100. The underside of the tapered end 94 of the cam lever 90 has a cam surface 102 with a variable slope.

The cam lever 90 is pivotally attached to the housing 14 by means of two identical cam lever bushings 104 and a cam pivot pin 114 which passes through the opening 96 in the wide end 92 of the cam lever 90. Wrapped around the cam lever bushings 104 is a cam lever spring 106 (as best seen in broken lines in FIG. 6). The cam lever spring 106 biases the end 92 of the cam lever 90 downwardly, or in a counterclockwise direction when viewed in FIG. 2. The housing 14 further includes two identical aligned apertures 112. The cam pivot pin 114 is received through the two aligned apertures 112 in the housing 14, the cam lever bushings 104 and the cam lever spring 106 and the opening 96 in the cam lever and is secured to the housing 14 by a clamp screw 116, as is best shown in FIG. 4.

The linkage 24 further includes a push rod 120, which is the means of transmitting force between the cam lever 90 and the master cylinder assembly 26. The push rod 120 is secured to the tapered end of the cam lever 90. The push rod 120 is the means of transmitting force between the cam lever 90 and the master cylinder assembly 26. The push rod 120 has a projection at its lower end that is snugly accommodated into the vertical opening 100 located at the tapered end 94 of the cam lever 90 (as shown in broken lines in FIG. 6), so that the push rod extends normal to the cam lever 90.

The master cylinder assembly 26 further includes a master piston 122 which is slidable vertically within a master cylinder 123. The master piston 122 is substantially cylindrical and hollow, and is exposed on its underside. The push rod 120 passes through an annular push rod retainer 124, which is pressed into place inside the master piston 122. The upper end of the push rod 120 is enlarged and trapped by the rod retainer 124.

As is best shown in FIG. 9, the surface of the upper end of the push rod 120, consistent with a preferred embodiment terminates in a tapered tip 121 which is in contact with the underside of the master piston 122. The tapered tip is structurally adapted such that it has an elongate cylindrical curvature of length L, and a radius R which is relatively small compared to length L. Upward or clockwise movement of the cam lever 90 causes the push rod 120 to be driven, in an angular direction describing a radial arc, so as to cause displacement of the piston 122. The cylindrical surface of the tapered tip 121 accounts for the variable angular orientation of the push rod 120 relative to the master piston 122 without causing high friction or wear of the master piston 122. Because of the small radius R at the tip, the push rod 120 advantageously maintains a nearly consistent area of contact with the piston 122 during actuation. Since the cylindrical surface is oriented normal to the plane in which the push rod 120 describes a radial arc, the length L of the elongate curvature of the tapered tip maintains a large surface area of contact between the master piston 122 and the push rod 120. This is facilitated by a radius to length ratio of less than unity ($R/L < 1$) and thus reduces stress at the tip without increasing wear and inefficiency. Existing push rods are generally cylindrical and have a radius R much greater than the length L, due to which the radius to length ratio is greater than unity ($R/L > 1$). Advantageously, the above-described improved structural adaptation of the push rod 120 enhances the effective transfer between the push rod 120 and the master piston 122.

The master cylinder assembly 26 further includes an annular dust ring 126 and an annular dust ring retainer 130 which surround the lower, open end of the master cylinder 123 to protect the master cylinder 123 and master piston 122 from dust and grit. A piston cup 154 and a piston o'ring (not shown) are secured to the master piston 122 and act to seal master piston 122 and the master cylinder 123.

The block 131 is secured within the housing 14 by means of a slim cylindrical cylinder locator pin 134. The block 131 includes an aperture 136 which is aligned with similar apertures 140 through the walls of the housing 14. The cylinder locator pin 134 is received through the apertures 136 in the block and the apertures 140 in the housing 14. As is best seen in FIG. 6, the block 131 includes the brake fluid reservoir 132 which is positioned vertically above a fluid outlet chamber 142, which is in turn positioned above the master cylinder assembly 26. The fluid outlet chamber 142 is a cylindrical chamber that is filled with brake fluid. The brake fluid reservoir 132 is in fluid communication with the fluid outlet chamber 142 via an inlet 144. The fluid outlet chamber 142 is also in fluid communication with the brake line 36 via an outlet 146.

A spherical valve member 148 moves freely within the fluid outlet chamber 142. Due to gravity, the spherical valve member 148 normally rests in a lower portion 150 of the fluid outlet chamber 142. When in this rest position, the spherical valve member 148 obstructs neither the inlet 144 from the brake fluid reservoir 132 to the fluid outlet chamber 142 nor the outlet 146 from the fluid outlet chamber 142 to the brake line 36 leading to the slave cylinders 32. Thus, fluid moves freely from the brake fluid reservoir 132 into the brake line 36 to keep it full. The spherical valve member 148 sits on a valve-ball retainer 152, which is formed from a spirally wound wire so as to allow free passage of fluid through the retainer 152. The valve-ball retainer 152 restricts the movement of the spherical valve member 148 so that it is retained within the fluid outlet chamber 142, and so that the spherical valve member 148 does not directly engage the master piston 122.

In operation, to actuate the brake system 10 the brake handle 12 is manually pulled towards the handlebar 16 which causes the cam lever 90 to rotate clockwise, as the cam roller 82 engages the cam surface 102 on the lever 90. The rotating movement of the cam lever 90 causes the push rod 120 to be displaced, in turn causing a large displacement of the master piston 122 due to the initial steep slope of the cam lever 90. The displacement of the master piston 122 causes the hydraulic fluid to force the spherical valve member upwardly against the inlet 144 to the brake fluid reservoir 132, thereby effectively blocking the flow of fluid between the fluid outlet chamber 142 and the brake fluid reservoir 132. Thus, the only available path of movement of the fluid from the fluid outlet chamber 142 in response to the applied pressure is through the brake line 36 to the slave cylinders 32. The pressure from the brake handle 12 is therefore transferred via the hydraulic fluid to the slave cylinders 32 which, as discussed below, cause engagement of the brake pads 34 with the rim 42. When the brake handle 12 is released, the spring 74 biases the handle 12 to its rest state. Likewise, the spring 106 biases the cam lever 90 and push rod 120 counterclockwise. The upper end of the push rod 120 acts on the rod retainer 124 to pull the master piston 122 downwardly, relieving pressure in the system. The spherical valve member 148 thus falls again to its rest position in the lower portion of the fluid outlet chamber 142, opening the path between the brake fluid reservoir 132 and the brake line 36. Any loss of fluid due to adjustment, or the like, is thus replenished directly from the brake fluid reservoir 132 to the brake line 36.

FIGS. 5 and 8 illustrate the bicycle fork 158 and wheel rim arrangement with details of the front caliper showing the component parts of the self-adjusting feature of this design. The front end of a conventional bicycle frame 156 has the front fork 158 that supports the bicycle wheel 40. The right and left front calipers 33,30 are also attached to the front fork 158. Each of the front calipers 33,30 comprise two segments, a main section 162 and a smaller clamp section 164. The main section 162, has two radially projecting hinges 166 at one end. A radially projecting hinge 168 on the clamp segment 164 is received between the hinges 166. A cylindrical clamp hinge pin 165 extends through aligned holes 169 in the hinges 166, 168 and pivotally secures the sections 162 and 164 together. The opposite end of the section 164 is secured by a pair of clamp bolts 170.

Each of the right and left front calipers 33,30 further include a slave cylinder 32 as best seen in FIG. 8. The caliper inlet 29 and the caliper outlet 31 extend into the slave cylinder 32. The hydraulic fluid is introduced to the slave cylinder 32 via the caliper inlet 29. Flow through the caliper outlet 31 of the right front caliper 33 establishes communication with the inlet 29 of the left front caliper 30 through a section of the brake line 36. The slave cylinder 32 includes a slave piston 196. The slave piston 196 is slidable horizontally within each slave cylinder 32. Proximate the slave piston 196 is a dust ring retainer 200 and a dust ring 202. A spacer bolt 204 is received through a cylindrical spacer 206, a small opening 208 in a quick change guide 210 and is threaded into a small opening 212 provided in the center of the brake pad 34. The slave piston 196 directly engages a rounded head 201 on the dust ring retainer 200 so that the displacement of the slave piston 196 is transmitted by the spacer 206 to cause displacement of the brake pads 34. Movement of the brake pad 34 is guided by means of a cradle lug 214. The cradle lug 214 is cylindrical in shape with a projecting portion towards the rear end. The cradle lug 214 is secured to each of the right and left front calipers 33,30 by means of a lug brace 216 which has a small opening 218 wherein the projecting portion of the cradle lug 214 is received. The front end of the cradle lug 214 is slidable received through an opening 220 in the brake pad 34 and a lug ring 222.

Parallel to and on either side of the slave cylinder 32 are two substantially identical retractor pin cavities 240 and 242 which extend through the right and left front calipers 30,33 as best seen in FIG. 8. Each of the retractor pin cavities 240,242 has a larger diameter section 244 at the front end and a smaller diameter section 246 toward the rear, wherein the larger diameter section 244 is separated from the smaller diameter section 246 by a biasing shoulder 248. Two identical retractor pins 174 are slidable horizontally within the cavities 240,242, respectively The retractor pins 174 are elongated and cylindrical, having an internally threaded cavity on the front end and a reduced diameter portion on the rear end. The front ends of the retractor pins 174 are fastened to the brake pads 34.

The brake pads 34 each consist of a friction pad 188 with protruding teeth-like portions extending radially outward towards the rim 42. Each of the friction pads 188 is bonded to a pad cradle 190. The cradle 190 include two horizontally aligned openings 192 to receive the retractor pins 174.

The retractor pins 174 are secured to the pad cradle 190 by two identical pad screws 194. The retractor pins 174 are received through two identical front retractor pin bushings 176 which are press fit into the front end of the retractor pin cavities 240,242. Two identical rear retractor pin bushings 186 surround the reduced diameter portion 246. Each of the retractor pins 174 is also surrounded by an annular grip ring 182, which frictionally engages the periphery of the retractor pins 174 in the larger diameter portion of the 244 retractor pin cavities 240,242. The grip rings 182 are sandwiched between a grip ring seat 184 which abuts against the shoulder 248, and a spring seat 180 which faces towards the front end of the retractor pin cavities 240,242. The grip rings 182 are slidable relative to the retractor pins 174 only upon application of a substantial force. A coiled retractor spring 178 surrounds each of the retractor pins 174, and extends between the spring seats 180 and the front retractor bushings 176. The biasing force applied to the grip rings 182 by the retractor springs 178 is not sufficient to cause slippage of the grip rings 182, yet biases the grip rings 182 and retractor pins 174 towards the rear of the retractor pin cavities 240,242, causing the brake pads 34 to be withdrawn from the rim 42, to a rest position.

The pressure from the brake handle 12 is transmitted via hydraulic fluid to the slave cylinders 32. The hydraulic fluid enters the slave cylinder 32 via the caliper inlet 29. The hydraulic fluid displaces the slave piston 196, slidable within the slave cylinder 32 which drives the dust ring retainer 200, in turn forcing the brake pads 34 to frictionally engage with the wheel rim 42. The rotation of the rim 42 applies a corresponding moment to the brake pads 34 during engagement, tending to cause brake pad chatter. However, the cradle lug 214 prevents rotation of the brake pads 34 thereby minimizing chatter. The displacement of the brake pads 34 causes a displacement of the retractor pins 174, in turn forcing the retractor springs to be compressed to the actuated position When the pressure from the brake handle 12 is released, the retractor pins 174 are biased to retract to the rest position by the retractor springs 178, bringing the brake pads 34 to the rest position.

The above-described arrangement also provides the self-adjusting feature of the present invention that accounts for the customary pad wear that occurs. As the brake pads 34 wear and become thinner, additional movement of the piston 196 and retraction pins 174 is required to engage the wheel rim 42. When wear of the brake pads 34 reaches a certain point, the spring 178 becomes completely compressed between the grip ring 182 and the front retractor bushing 176, and the force of the hydraulic pressure pressing against the piston 196 causes the retraction pins 174 to slip within the grip rings 182. When the hydraulic pressure is released, the spring 178 will push against the grip ring 182 and thus against the retraction pins 174 to cause the brake pads 34 to be pulled away from the wheel rim 42, however when the grip rings 182 abut the shoulder 248, the brake pads 34 will have assumed a new rest position, closer to the rim 42. This self-adjusting feature also works in reverse, that is, when the brake pads 34 are manually pushed away from the bicycle rim 42 to permit removal of the bicycle wheel 40 for repair or maintenance. By pushing the brake pads 34 further from the rim 42 when the brake pads 34 are already in their rest state, the grip rings 182 remain stationary, abutting against the shoulder 248, while the retractor pins 174 slide to the rear, relative to the grip rings 182. As a result, the brake pads 34 are forced into a new rest position, further away from the rim 42. The brake pads 34 will return to their normal rest position upon braking, in the manner of the self adjusting feature described above.

FIG. 4 illustrates in greater detail the novel structure for mounting the brake handle housing 14 to the handlebar 16. A C-shaped housing clamp 20 conforms to the exterior surface of the handlebar 16. The housing clamp 20 is preferably formed from a rigid metallic strip. The housing clamp 20 terminates in two substantially parallel extending portions 226 at either end. The extending portions 226 of the housing clamp 20 are surrounded by the deviating projections 52,54 of the housing 14 in such a way that the deviating projections 52,54 of the housing 14 abut against the C-shaped portion of the housing clamp 20.

At either end of the extending portions 226 is mounted a small diameter clamp catch pin 22 having a flat head 227 of larger diameter. The deviating projections 52,54 of the housing 14 include apertures 230 through which the heads 227 of each of the clamp catch pins 22 emerge. The projections 52,54 of the housing 14 gradually deviate from each other in opposing directions as they approach the handlebar 16. The deviating projecting portions 52,54 of the housing 14 are brought closer together by increasing the tension in the clamp screw 116. With the increase in tension, the deviating projecting portions 52,54, bring the extending portions 226 of the housing clamp 20 closer together. As the deviating projecting portions 52,54 slide relative to the C-shaped portion 224, the apertures 230 are slightly offset relative to the flat heads 227 of the clamp catch pin 22, thus securing the housing 14 to the clamp catch pin 22.

Advantageously, the housing 14 is detached from the handlebar 16 by simply releasing the tension in the clamp screw 116 so that the deviating projecting portions 52,54 of the housing 14 deflect away from each other such that the offset apertures 230 are centered around the flat heads 227 of the clamp catch pin 22, enabling the heads to easily slip through the apertures 230.

FIG. 7 illustrates a hose fitting 172 which preferably forms a connection between the brake line 36 and the caliper inlet 29 in the right front caliper 33 and between the brake line 36 and the fluid outlet chamber 142 in the block 131. The hose fitting 172 also connects the caliper outlet 31 in the right front caliper 33 with the caliper inlet 29 in the left front caliper 30. The hose fitting 172 provides an improved seal, reduces wear and tear of the brake line 36, and is easily detached. The hose fitting 172 comprises a female member 230 having an internally threaded portion that is adjacent a smaller diameter tapered, unthreaded portion. The tapered portion mates with the external portion of the brake line 36. The female member 230 is formed by apertures in the right and left front calipers 33,30 to provide fluid communication with the inlets 29 and the outlets 31 of the front calipers 33,30.

The hose fitting 172 further comprises a tubular male member 232 through which the end portion of the brake line 36 extends. The male member 232 is provided with an externally threaded portion which mates with the threaded portion of the female member 230. The brake line 36 protrudes through the male member 232 and is secured by a crimp ring 236 that surrounds the exterior of the brake line 36. When the male member 232 and the female member 230 are threaded together, the brake line 36, via the crimp ring 236, is forced into the tapered, unthreaded portion of the female member 230. The crimp ring 236 holds the brake line 36 firmly in place relative to the male member 232. The brake line 36 is formed of plastic and is deformable. The tapered surface of the female member 230 tapers to a smaller diameter than the outside diameter of the brake line 36 so as to sealingly engage the brake line 36. The smoothness of the tapered surface prevents the brake line 36 from being damaged at the ends, unlike previous hose fittings. Thus the hose fitting 172 can be connected and disconnected repeatedly without requiring replacement of the brake lines 36. The outside diameter of the male member 232 is preferably tapered as well, to facilitate manual grasping during threading and unthreading of the male member 232.

What is claimed is:

1. An improved hydraulic brake apparatus for a bicycle, comprising:
    a means for actuating said brake apparatus;
    a brake fluid reservoir;
    a fluid outlet chamber, said fluid outlet chamber oriented vertically below said brake fluid reservoir, said fluid outlet chamber comprising:
        an inlet providing fluid communication between said reservoir and said fluid outlet chamber;
        an outlet providing fluid communication between said fluid outlet chamber and a brake line, said brake line being filled with brake fluid; and
        a valve member, said valve member having a rest position and an actuated position, said valve member when in said rest position allowing flow of fluid from said brake fluid reservoir to said fluid outlet chamber through said inlet and when in said actuated position obstructing flow through said inlet; said inlet, outlet and valve member oriented to prevent obstruction of said outlet by said valve member;
    a master cylinder, said master cylinder in fluid communication with said brake fluid reservoir through said fluid outlet chamber, said inlet providing a single flow path between said brake fluid reservoir and said master cylinder;
    a piston, slidable within said master cylinder, said piston inducing hydraulic pressure in said fluid outlet chamber upon displacement, said actuating means causing displacement of said piston, said hydraulic pressure displacing said valve member from said rest position to said actuated position; and
    a brake means disposed proximate a wheel on said bicycle, said brake means upon actuation enforcing braking conditions on said wheel, hydraulic pressure in said brake line causing actuation of said brake means.

2. The apparatus of claim 1 wherein said actuating means comprises a brake handle, said brake handle displaced manually from a rest position to an actuated position.

3. The apparatus of claim 1 wherein said brake means comprises:
    brake pads which are displaced by slave cylinder assemblies into frictional contact with said bicycle wheel to enforce braking conditions.

4. An improved hydraulic brake apparatus for bicycles as defined in claim 1, wherein said fluid outlet chamber includes a lower portion and an upper portion, said rest position of said valve member being in said lower portion of said fluid outlet chamber and said valve member being biased only by gravity into said rest position, said outlet oriented above said rest position of said valve member so as to permit flow through said outlet and into said fluid reservoir when said valve member is in said rest position.

5. An improved hydraulic brake apparatus for bicycles as defined in claim 1, wherein said valve member assumes said rest position as a result of gravitational force when said brake apparatus is not actuated.

6. An improved hydraulic brake apparatus for bicycles as defined in claim 1, wherein said fluid outlet chamber includes an upper portion and a lower portion, and wherein said actuated position of said valve member is in said upper portion of said fluid outlet chamber, said outlet oriented below said actuated position of said valve member so as to permit flow through said outlet when said valve member is actuated.

7. An improved hydraulic brake apparatus for bicycles as defined in claim 2, wherein said brake handle is connected to said master cylinder assembly by a mechanical linkage, said mechanical linkage comprising:
    a cam roller mounted on said brake handle;
    a rotatable cam lever, said cam lever engaged by said cam roller, said cam lever having a variable slope, said variable slope comprising an initial steep slope and a shallower following slope,
    a push rod engaging said piston, said push rod connected to said cam lever, said push rod transmitting force between said cam lever and said piston so as to cause displacement of said piston; and
    wherein initial displacement of said brake handle from said rest position causes a large displacement of said piston due to engagement of said cam roller with said initial steep slope, subsequent engagement of said cam roller with said shallower following slope providing an increased mechanical advantage so as to result in a greater braking force for a greater degree of brake handle displacement.

8. An improved hydraulic brake apparatus for a bicycle, comprising:
    a means for actuating said brake apparatus;
    a brake fluid reservoir;
    a fluid outlet chamber, said fluid outlet chamber oriented vertically below said brake fluid reservoir, said fluid outlet chamber comprising:
        an inlet providing fluid communication between said reservoir and said fluid outlet chamber;
        an outlet providing fluid communication between said fluid outlet chamber and a brake line, said brake line being filled with brake fluid; and
        a valve member having a rest position and an actuated position, said valve member when in said rest position allowing flow of fluid from said brake fluid reservoir to said fluid outlet chamber through said inlet and when in said actuated position obstructing flow through said inlet; said inlet, outlet and valve member oriented to prevent obstruction of said outlet by said valve member;

a master cylinder, said master cylinder in fluid communication with said brake fluid reservoir through said fluid outlet chamber, said inlet providing a single flow path between said brake fluid reservoir and said master cylinder;

a piston, slidable within said master cylinder, said piston inducing hydraulic pressure in said fluid outlet chamber upon displacement, said actuating means causing displacement of said piston, said hydraulic pressure displacing said valve member from said rest position to said actuated position;

a push rod, said actuating means causes displacement of said push rod, said push rod engaging said piston so as to cause displacement of said piston, wherein said push rod is displaced along an arcuate path about an axis of rotation, said push rod having a projecting portion which engages said piston so as to minimize wear between said push rod and said piston, said projecting portion tapering to a top having a small radius and a substantially elongate cylindrical curvature, a radius to length ratio being less than unity, and a longitudinal axis which is substantially parallel to said axis of rotation; and a brake means disposed proximate a wheel on said bicycle, said brake means upon actuation enforcing braking conditions on said wheel, hydraulic pressure in said brake line causing actuation of said brake means.

9. An improved hydraulic brake apparatus for bicycles as defined in claim 1, wherein said fluid outlet chamber is in fluid communication with said brake fluid reservoir via a single inlet.

10. The apparatus of claim 1 wherein said brake means comprises:
a slave cylinder in fluid communication with said brake line;
a slave piston slidable within said slave cylinder, hydraulic pressure in said slave cylinder causing displacement of said slave piston; and
brake pads joined to said slave piston so as to be displaced therewith, said brake pads frictionally engaging said bicycle wheel upon actuation of said brake apparatus.

11. An improved hydraulic brake apparatus for bicycles as defined in claim 10, wherein said brake pads are adapted to be pushed away from said wheel to facilitate removing said wheel from said bicycle, and wherein said brake fluid returns to said brake fluid reservoir from said slave cylinders directly via said brake line without interference from said valve member, said valve member gravitationally biased away from said inlet.

12. An improved hydraulic brake apparatus for bicycles as defined in claim 10, wherein said apparatus further comprises:
a slave cylinder housing;
a biasing member in said slave cylinder housing for biasing said brake pad away from said wheel so as to cause retraction of said brake pad upon release of hydraulic pressure within said slave cylinder;
a retraction member joined to said brake pad, said retraction member slidable through said slave cylinder housing and guiding displacement of said brake pad; and
a grip member frictionally engaging said retraction member, said grip member positioned on said retraction member so as to abut said cylinder housing and limit displacement of said brake pad from said wheel within a predetermined range, wherein upon wear of said brake pad causing a need for greater displacement of said brake pad to engage said wheel, actuation of said brake apparatus automatically causes said biasing member to be compressed between said grip member and said cylinder housing which causes said grip member to slide relative to said retraction member, the force applied by said slave piston to displace said brake pad exceeding the force required to overcome the frictional engagement between said retraction member and said grip member, so as to displace said grip member the amount necessary to maintain brake pads displacement with said predetermined range.

13. An improved hydraulic brake apparatus for bicycles as defined in claim 2, wherein said bicycle further comprises a handlebar, said apparatus further comprising:
a housing structure surrounding said master cylinder and brake fluid reservoir, said housing structure having two deviating projections which abut against said handlebar and are adapted to facilitate installation to and detachment from said handlebar;
a C-shaped housing clamp surrounding said handlebar, said clamp having two spaced extensions, said deviating projections of said housing structure surrounding said extensions of said C-shaped housing clamp;
at least one pin extending from one of either said C-clamp extension or said deviating projection, said pin aligned with an oversized aperture formed in the other of either said C-clamp extension or said deviating projection of said housing structure, said pin having a head which passes through said oversized aperture in said housing projection; and
a removable fastener extending through said deviating projections of said housing structure, said deviating projections being drawn closer together to tightening said fastener, causing displacement of said housing from said handlebar, resulting in overlap of said pin head and the periphery of said aperture and forcing said pin away from said handlebar.

14. An improved hydraulic brake apparatus for bicycles, said improved hydraulic brake apparatus comprising:
a brake fluid reservoir; and
a fluid outlet chamber, said fluid outlet chamber oriented below said brake fluid reservoir, said fluid outlet chamber comprising:
an inlet providing fluid communication between said brake fluid reservoir and said fluid outlet chamber;
an outlet providing fluid communication between said fluid outlet chamber and a brake line, said brake line being filled with brake fluid; and
a master cylinder assembly, said master cylinder assembly vertically oriented below said brake fluid reservoir and said fluid outlet chamber to facilitate flow of fluid along a single path from said brake fluid reservoir through said inlet to said fluid outlet chamber and said master cylinder assembly.

15. An improved hydraulic brake apparatus for bicycles, said hydraulic brake apparatus comprising:
a brake handle, said brake handle manually displaced from a rest position to an actuated position;
a master cylinder assembly, said master cylinder assembly having a piston, said piston inducing hydraulic pressure when said brake handle is displaced from said rest position to said actuated position;

a mechanical linkage, said mechanical linkage for transmitting force from said brake handle to said piston, said mechanical linkage comprising:

a cam roller, said cam roller connected to said brake handle;

a cam lever, said cam lever engaged by said cam roller, said cam lever having a surface with a steep initial slope and a shallower following slope, said brake handle when in said rest position having a large mechanical advantage provided by said steep initial slope causing a large displacement of said piston, said shallower following slope progressively providing an increased mechanical advantage.

16. An improved hydraulic brake apparatus for bicycles, said hydraulic brake apparatus comprising:

a brake handle, said brake handle manually displaced from a rest position to an actuated position;

a master cylinder assembly, said master cylinder assembly having a piston, said piston inducing hydraulic pressure when said brake handle is displaced from said rest position to said actuated position; and a mechanical linkage, said mechanical linkage for transmitting force from said brake handle to said piston, said mechanical linkage comprising:

a cam roller, said cam roller connected to said brake handle;

a cam lever, said cam lever engaged by said cam roller, said cam lever having a surface with a steep initial slope and a shallower following slope, said brake handle when in said rest position having a large mechanical advantage provided by said steep initial slope causing a large displacement of said piston, said shallower following slope progressively providing an increased mechanical advantage; and a push rod, said cam lever causes displacement of a push rod, said push rod engaging said piston so as to cause displacement of said piston, wherein said push rod is displaced along an arcuate path about an axis of rotation, said push rod having a projecting portion tapering to a tip having a small radius and a substantially elongate, cylindrical curvature, and a longitudinal axis which is substantially parallel to said axis of rotation.

17. An improved hydraulic brake apparatus for a bicycle, comprising:

a means for actuating said brake apparatus;
a brake fluid reservoir;
a fluid outlet chamber, said fluid outlet chamber having an inlet which provides fluid communication between said brake fluid reservoir and said fluid outlet chamber and an outlet which provides fluid communication between said fluid outlet chamber and a brake line, said brake line being filled with brake fluid;

a valve member disposed within said fluid outlet chamber such that when said brake apparatus is at rest said valve member allows fluid flow from said brake fluid reservoir to said fluid outlet chamber through said inlet and when said brake apparatus is actuated said valve member obstructs fluid flow through said inlet; said inlet, outlet and valve member oriented to prevent obstruction of said outlet by said valve member;

a master cylinder assembly having a master cylinder in fluid communication with said brake fluid reservoir through said fluid outlet chamber, said inlet providing a single flow path and a piston slidable within said master cylinder, said piston inducing hydraulic pressure in said fluid outlet chamber upon displacement caused by said actuating means; and a brake means disposed proximate a wheel on said bicycle, said brake means upon actuation enforcing conditions on said wheel, hydraulic pressure in said brake line causing actuation of said brake means.

18. An improved hydraulic brake apparatus for a bicycle as defined in claim 17, wherein said valve member is substantially spherical in shape.

19. An improved hydraulic brake apparatus for a bicycle as defined in claim 18, wherein said fluid outlet chamber is oriented vertically below said brake fluid reservoir.

20. An improved hydraulic brake apparatus for bicycles, comprising:

a primary arm for actuating said brake apparatus;
a master cylinder assembly, said master cylinder assembly actuated by said primary arm; and
a mechanical linkage for transmitting displacement of said primary arm to said master cylinder assembly, said mechanical linkage comprising:

a rotatable secondary lever, said secondary lever being driven by said primary arm, wherein said primary arm is displaced along a path substantially perpendicular to a central axis through said master cylinder assembly, thereby facilitating increased leverage.

21. An improved hydraulic brake apparatus for bicycles, as defined in claim 20, additionally comprising:

a cam roller mounted on said primary arm, said cam roller engaging said secondary lever, said secondary lever having a variable slope, said variable slope comprising an initial steep slope and a shallower following slope, wherein initial displacement of said primary lever from a rest position causes said cam roller to engage said initial steep slope and subsequent engagement of said cam roller with said shallower following slope provides an increased mechanical advantage so as to result in a greater braking force for a greater degree of primary arm displacement.

22. An improved hydraulic brake apparatus for bicycles, as defined in claim 21, wherein said variable slope comprises an initial steep slope and a shallower following slope.

23. An improved hydraulic brake apparatus for bicycles as defined in claim 22, wherein said pin extends from said C-clamp extension and said aperture is formed in said housing projection.

24. An improved brake apparatus for bicycles, comprising:

a handle, said handle manually displaced from a rest position to an actuated position;
means for transmitting displacement of said handle to a caliper which causes braking; and
a cam roller which is displaced upon actuation of said handle, causing said cam roller to engage and displace a cam lever which in turn actuates said transmitting means, said cam lever having a steep initial slope and shallower following slope, said brake handle when in said rest position having a large mechanical advantage provided by said steep initial slope transmitting a large displacement through said transmitting means, said shallower following slope progressively providing an increased mechanical advantage.

25. An improved brake apparatus for bicycles as defined in claim 24, wherein said means for transmitting displacement is a master cylinder assembly, said master cylinder assembly having a piston, displacement of said piston inducing hydraulic pressure when said brake handle is displaced from said rest position to said actuated position.

26. An improved hydraulic brake apparatus for a bicycle, comprising:
   a means for actuating said brake apparatus;
   a brake fluid reservoir;
   a fluid outlet chamber, said fluid outlet chamber oriented vertically below said brake fluid reservoir, said fluid outlet chamber comprising:
      an inlet providing fluid communication between said reservoir and said fluid outlet chamber;
      a master cylinder opening providing fluid communication between said fluid outlet chamber and a master cylinder;
      an outlet providing fluid communication between said fluid outlet chamber and a brake line, said brake line being filled with brake fluid, said outlet oriented substantially perpendicular to said inlet and said master cylinder opening;
      a valve member positioned within said fluid outlet chamber and capable of movement freely within said chamber, said valve member having a rest position and an actuated position, said valve member biased by gravity to said rest position, said valve member when in said rest position allowing flow of fluid from said brake fluid reservoir to said fluid outlet chamber through said inlet and also from said master cylinder to said fluid outlet chamber through said master cylinder opening, said valve member when in said actuated position obstructing flow through said inlet, said inlet, outlet and master cylinder opening oriented such that when in said rest position said valve member positioned substantially below said outlet to prevent obstruction of said outlet and when in said actuated position said valve member positioned substantially above said outlet to prevent obstruction of said outlet;
   a piston slidable within said master cylinder, said piston inducing hydraulic pressure in said fluid outlet chamber upon displacement, said actuating means causing displacement of said piston, said hydraulic pressure displacing said valve member from said rest position to said actuated position; and
   a brake means disposed proximate a wheel on said bicycle, said brake means upon actuation enforcing braking conditions on said wheel, hydraulic pressure in said brake line causing actuation of said brake means.

* * * * *